(No Model.)
A. G. GOLDING.
GONG BELL.
No. 246,119.                     Patented Aug. 23, 1881.
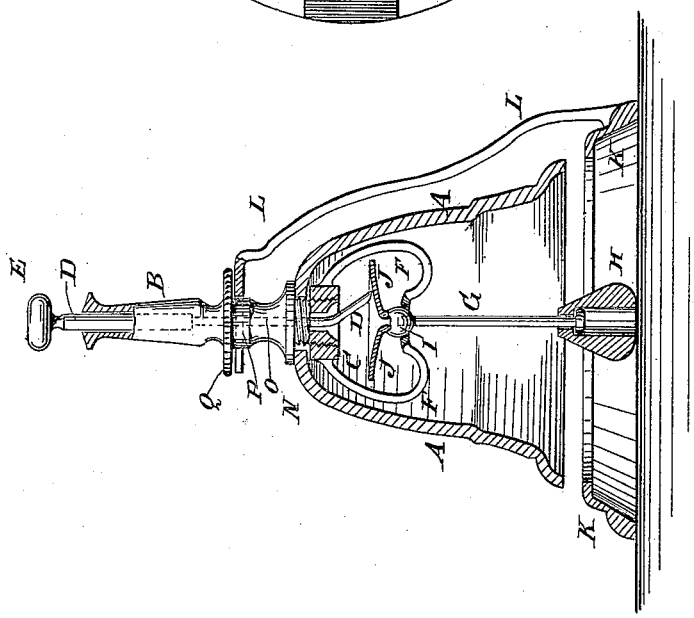
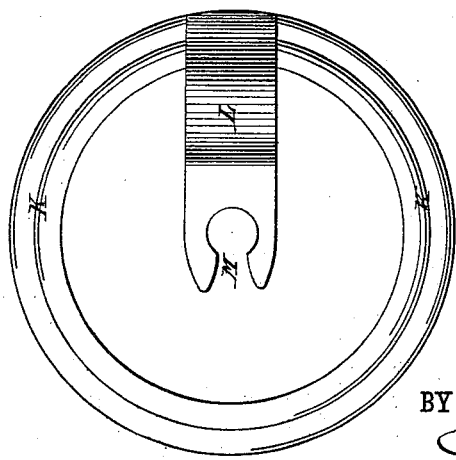
WITNESSES:
Chas. Nida.
C. Sedgwick
INVENTOR:
A. G. Golding
BY Munn & Co.
ATTORNEYS.
N. PETERS, Photo-Lithographer, Washington, D. C.

UNITED STATES PATENT OFFICE.

ASA G. GOLDING, OF NEW YORK, N. Y.

GONG-BELL.

SPECIFICATION forming part of Letters Patent No. 246,119, dated August 23, 1881.

Application filed May 13, 1881. (No model.)

*To all whom it may concern:*

Be it known that I, ASA G. GOLDING, of the city, county, and State of New York, have invented a new and useful Improvement in Gong-Bells, of which the following is a specification.

Figure 1 is a sectional side elevation of my improvement. Fig. 2 is a plan view of the stand. Fig. 3 is a plan view of a modified form of the stand.

Similar letters of reference indicate corresponding parts.

The object of this invention is to increase the usefulness of gong-bells by constructing them in such a manner that they can be readily detached from their stands and used as hand-bells.

The invention consists in constructing a gong-bell with a handle attached to the bell and having a neck, a shoulder, and a flange for suspending the bell detachably, a push-rod having its lower end bent to one side, a bell-clapper supported from a suspended frame and having a ball and a concaved disk at its upper end and a loose head at its lower end, and a standard having a base and having the horizontal upper end slotted to receive the bell-handle, as will be hereinafter fully described.

A represents the bell, which is made in the usual manner.

B is a handle, the lower end of which passes through a hole in the center of the bell A, and has a nut, C, screwed upon its lower end within the said bell A. The handle B is perforated longitudinally to receive the rod D, which has a knob, E, formed upon or attached to its upper end. The rod D, a little below the lower end of the handle B, is bent to one side at an angle, as shown in Fig. 1.

Upon the nut C is formed a loop or frame, F, the middle part of which is bent upward, as shown in Fig. 1, is flattened, and has a hole formed through it to receive the rod or shank G of the bell-clapper H. The hole through the frame F is countersunk upon the upper side to form a seat for the ball I, formed upon or attached to the upper end of the rod or shank G, so that the bell-clapper will swing freely in every direction.

Upon the upper end of the rod or shank G or the top of the ball I is formed, or to it is attached, a disk, J, the upper side of which is concaved, as shown in Fig. 1. The clapper-head H is perforated longitudinally to receive the rod or shank G, and the said perforation is countersunk from its lower end to receive and form a seat for the head formed upon the lower end of the shank or rod G. With this construction when the rod D is pushed downward the bent lower end of the said rod is pressed against the concaved disk or plate J at one side of its center, so that said disk will operate as a lever and swing the clapper-head H against the side of the bell A, the loose connection between the shank G and head H causing the said head to be thrown forward by its own momentum and allowing it to be thrown back or rebound quicker than would be possible were the shank G and head H rigidly connected, so that the vibrations of the bell will not be checked by a continued contact of the clapper with the bell, and will thus give a clearer sound.

The base K of the stand is made in ring form and of a size a little greater than that of the mouth of the bell A.

Upon the side of the base K is formed or to it is attached the lower end of the standard or post L, which is bent to correspond with the general form of the side of the bell A. The standard L, at a point a little above the bell A, is bent inward into a horizontal position, and has a slot, M, formed in its end. The outer end of the slot M is widened or flared, and its inner end is enlarged into circular form, as shown in Fig. 2.

The handle B, a little above the shoulder N, that rests upon the bell A, is turned down or has a neck, O, formed in it of such a size that the said neck will pass through the narrow part of the slot M and allow the larger part or shoulder P of the said handle B above the said neck O to enter the enlarged inner part of the said slot M, the flange Q of the said handle resting upon the upper side of the horizontal part of the standard L, so that the bell will be firmly and securely supported when used as a gong. With this construction, by raising the bell A so as to bring the neck O of the handle B in line with the slot M the said bell can be readily detached and used as a hand-bell.

If desired the base K can have a second standard, L', upon it, opposite the first standard, L. In this case the horizontal upper ends of the two standards should be in the same plane and at such a distance apart that the neck O of the bell-handle B can be readily passed between them from either side. In this case the adjacent ends of the standards L L' have half-round notches formed in them to receive the shoulder P of the handle B, the flange Q resting upon both ends.

Having thus fully described my invention, I claim as new, and desire to secure by Letters Patent—

1. A gong-bell constructed substantially as herein shown and described, consisting of the bell A, the perforated handle B, having neck O, shoulder P, and flange Q, the push-rod D, having its lower end bent to one side, the clapper-supporting frame F, the clapper-shank G, having ball I and concaved disk J at its upper end, and a loose head, H, at its lower end, and the stand K L, as set forth.

2. In a gong-bell, the combination, with the push-rod D, having its lower end bent to one side, and the bell-clapper G H, suspended by a ball-and-socket joint, of the disk J, having its upper side concaved, substantially as herein shown and described, whereby the clapper will be operated by the downward movement of the bent push-rod, as set forth.

3. In a gong-bell, the bell-clapper G H, constructed, substantially as herein shown and described, with the head H loosely connected with the rod G, whereby the said head will be thrown forward by its momentum to give a quick blow, and can instantly rebound to prevent the vibrations of the bell from being checked by the continued contact of the clapper-head, as set forth.

4. In a gong-bell, the handle B constructed with a neck, O, shoulder P, and flange Q, substantially as herein shown and described, whereby the bell-handle can be suspended and detached from a slotted support, as set forth.

5. In a gong-bell, the combination, with the bell-handle B, having neck O, shoulder P, and flange Q, of a standard, L, having a base, K, and having a slot, M, in the horizontal upper end, substantially as herein shown and described, whereby the bell will be detachably supported, as set forth.

ASA G. GOLDING.

Witnesses:
C. SEDGWICK,
J. H. SCARBOROUGH.